US008364818B2

(12) United States Patent
Jeng et al.

(10) Patent No.: US 8,364,818 B2
(45) Date of Patent: *Jan. 29, 2013

(54) REDUCTION OF MESSAGE FLOW BETWEEN BUS-CONNECTED CONSUMERS AND PRODUCERS

(75) Inventors: Jun-Jang Jeng, Armonk, NY (US); Christian A. Lang, New York, NY (US); Ioana Stanoi, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 487 days.

This patent is subject to a terminal disclaimer.

(21) Appl. No.: 12/434,840

(22) Filed: May 4, 2009

(65) Prior Publication Data

US 2009/0216899 A1    Aug. 27, 2009

Related U.S. Application Data

(63) Continuation of application No. 11/495,312, filed on Jul. 27, 2006, now Pat. No. 7,529,849.

(51) Int. Cl.
*G06F 15/173* (2006.01)
(52) U.S. Cl. ........... 709/226; 709/234; 709/238; 710/29
(58) Field of Classification Search .................. 709/226, 709/234, 238
See application file for complete search history.

(56) References Cited

U.S. PATENT DOCUMENTS

| | | | | |
|---|---|---|---|---|
| 5,257,374 A * | 10/1993 | Hammer et al. | ............... | 718/105 |
| 5,487,168 A * | 1/1996 | Geiner et al. | ................ | 705/7.12 |
| 7,088,371 B2 * | 8/2006 | Lippincott | .................... | 345/573 |
| 7,093,080 B2 * | 8/2006 | Day et al. | ....................... | 711/141 |
| 7,240,182 B2 * | 7/2007 | Day et al. | ......................... | 712/34 |
| 7,478,390 B2 * | 1/2009 | Brokenshire et al. | ......... | 718/100 |
| 7,516,456 B2 * | 4/2009 | Aguilar et al. | ................ | 718/102 |
| 7,523,157 B2 * | 4/2009 | Aguilar et al. | ................ | 709/202 |
| 7,549,145 B2 * | 6/2009 | Aguilar et al. | ................ | 717/149 |
| 7,653,908 B2 * | 1/2010 | Aguilar et al. | ................ | 718/104 |
| 7,694,306 B2 * | 4/2010 | Minor et al. | ................... | 718/105 |
| 7,748,006 B2 * | 6/2010 | Aguilar et al. | ................ | 718/104 |

(Continued)

FOREIGN PATENT DOCUMENTS

| EP | 1 533 699 A1 | 5/2005 |
|---|---|---|
| JP | 6149756 | 5/1994 |

(Continued)

OTHER PUBLICATIONS

Viglas, S., et al., "Rate-Based Query Optimization for Streaming Information Sources," In *SIGMOD Conference*, 2002.

(Continued)

*Primary Examiner* — Patrice Winder
*Assistant Examiner* — Tauqir Hussain
(74) *Attorney, Agent, or Firm* — Jon A. Gibbons; Thomas Grzesik; Fleit Gibbons Gutman Bongini & Bianco PL

(57) ABSTRACT

A system, method, and computer readable medium for reducing message flow on a message bus are disclosed. The method includes determining if at least one logical operator in a plurality of logical operators requires processing on a given physical processing node in a group of physical nodes. In response to determining that the logical operator requires processing on the given physical processing node, the logical operator is pinned to the given physical processing node. Each logical operator in the plurality of logical operators is assigned to an initial physical processing node in the group of physical processing nodes on a message bus.

17 Claims, 12 Drawing Sheets

U.S. PATENT DOCUMENTS

| | | | | |
|---|---|---|---|---|
| 8,032,849 B2* | 10/2011 | Hofstee et al. | | 716/110 |
| 8,032,871 B2* | 10/2011 | Brokenshire et al. | | 717/140 |
| 8,091,078 B2* | 1/2012 | Brokenshire et al. | | 717/143 |
| 2002/0156993 A1* | 10/2002 | Suzuoki et al. | | 712/30 |
| 2005/0193113 A1* | 9/2005 | Kokusho et al. | | 709/225 |

FOREIGN PATENT DOCUMENTS

| | | |
|---|---|---|
| JP | 7334438 | 12/1995 |
| JP | 8030558 | 2/1996 |
| JP | 2002366534 | 12/2002 |
| JP | 2004348680 | 12/2004 |
| JP | 2005004676 | 1/2005 |

OTHER PUBLICATIONS

Ahmad, Y., et al., "Network-Aware Query Processing for Stream-based Applications," In *VLDB* (*2004*), pp. 456-467.

Shneidman, J., "A Cost-Space Approach to Distributed Query Optimization in Stream-Based Overlays," In *NetDB*, 2005.

Srivastava, U., et al., "Operator Placement for In-Network Stream Query Processing," In *PODS '05: Proceedings of the twenty-fourth ACM SlGMOD-SIGACT-SIGART symposium on Principles of database systemsl*, 2005.

International Search Report dated Oct. 1, 2007 for International Application No. PCT/EP2007/057027.

\* cited by examiner

REDUCTION OF MESSAGE FLOW BETWEEN BUS-CONNECTED CONSUMERS AND PRODUCERS

CROSS REFERENCE TO RELATED APPLICATIONS

This is a continuation of application Ser. No. 11/495,312, filed Jul. 27, 2006, now U.S. Pat. No. 7,529,849, the disclosure of which is incorporated hereinto by reference in its entirety.

FIELD OF THE INVENTION

The present invention generally relates to the field of distributed processing systems, and more particularly relates to reducing message flow between processing nodes in the distributed processing system.

BACKGROUND OF THE INVENTION

Companies increasingly automate their business processes, and more importantly, they automate more of the lower level tasks involved. Currently, companies are required by internal and external regulations such as Sarbanes-Oxley, HIPPA and the Patriotic Act to maintain accurate bookkeeping that documents processes, activities, procedures and business reporting. In response, organizations turn to solutions like Business Activity Monitoring ("BAM") to automate and control their business processes.

In addition to the necessity for compliance with new federal regulations, automated monitoring of business processes also leads to an increase in productivity. Since events flow between several enterprise layers, the events can be used to provide an integrated view of various components of the layers. Events resemble the blood cells flowing through the entire system, carrying information and sustaining the entire process The following discussion illustrates some of the challenges introduced by a complex monitoring system that fully exploits events. The first challenge is scalability with respect to event sources and monitors. For example, consider the effects on event management that arise due to requirements of complex monitoring applications. Events flow between various architectural layers, and they are subsequently stored and retrieved for monitoring-related tasks of analytical processing. As a result of the automation of business process tasks, there is an increase in the number of events that are produced and are necessary for analysis. At the same time, the requirements for increasingly complex queries over these events also escalate. These processes compete for the same event-management resources. Another effect of the growing number of events that flow through the system is the congestion of the network and computational resources.

Note that reducing the load on the event-management storage by allowing only simple queries is not an option, since it leads to a decrease in features and potential of the monitoring system. Another challenge is with event storage and query contention. The result of increasing the number and detail of automated business tasks is a greater number of events. At a minimum, the events that contribute to the calculation of essential key performance indicators ("KPIs") should be stored for further analysis. This information is essential in understanding the provenience of the problems the metrics indicate. While the quantity of events to be stored increases, the number and complexity of queries over events also increases. Since event-management databases have to support both updates and queries, they become the bottleneck of the entire system Yet another challenge is with network and computational resources. For example, many current complex monitoring systems experience network and middleware congestion from the growth in the number and rate of events generated by business processes. These complex monitoring systems also perform useless computations at the application level. Events that are not necessary to the computation of metrics still need to be processed and filtered, which may lead to another potential bottleneck. Redundant computations are also performed by many of the current monitoring systems. Filtering steps can include computation that is redundant between different monitoring contexts and even between different monitors.

Therefore a need exists to overcome the problems with the prior art as discussed above.

SUMMARY OF THE INVENTION

Briefly, in accordance with the present invention, disclosed are a system, method, and computer readable medium for reducing message flow on a message bus. The method includes determining if at least one logical operator in a plurality of logical operators requires processing on a given physical processing node in a group of physical nodes. In response to determining that the logical operator requires processing on the given physical processing node, the logical operator is pinned to the given physical processing node. Each logical operator in the plurality of logical operators is assigned to an initial physical processing node in the group of physical processing nodes on a message bus.

In another embodiment a system for reducing message flow on a message bus, is disclosed. The system comprises a plurality of physical processing nodes communicatively coupled to a message bus. At least one information processing system is communicatively coupled to the plurality of physical processing node. The information processing system includes a logical operator pinner for determining if at least one logical operator in a plurality of logical operators residing on at least one of the physical processing nodes requires processing on one of the physical processing nodes. The logical operator pinner, in response to determining that the logical operator requires processing on the given physical processing node, pins the logical operator to the given physical processing node. The information processing system also includes a logical operator assignor for assigning each logical operator in the plurality of logical operators to an initial physical processing node in the plurality of physical processing nodes on a message bus.

In another embodiment, a computer readable medium for reducing message flow on a message bus is disclosed. The computer readable medium comprises instructions for determining if at least one logical operator in a plurality of logical operators requires processing on a given physical processing node in a group of physical nodes. In response to determining that the logical operator requires processing on the given physical processing node, the logical operator is pinned to the given physical processing node. Each logical operator in the plurality of logical operators is assigned to an initial physical processing node in the group of physical processing nodes on a message bus.

One advantage of the present invention is that message flow between components of a distributed stream processing system is reduced and processing loads are balanced. Another advantage of the present invention is that data congestion created by the storage and query of events is relieved by identifying events that are not necessary for subscribing applications. A model-driven "data discrimination" approach that is based on a model of the application's monitoring computation model is used, in one embodiment, to filter out the events that are not useful to subscribing applications. This provides a reduction in the number of messages sent to the network, a reduction in computation at different components, and a reduction in redundant filtering conditions.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
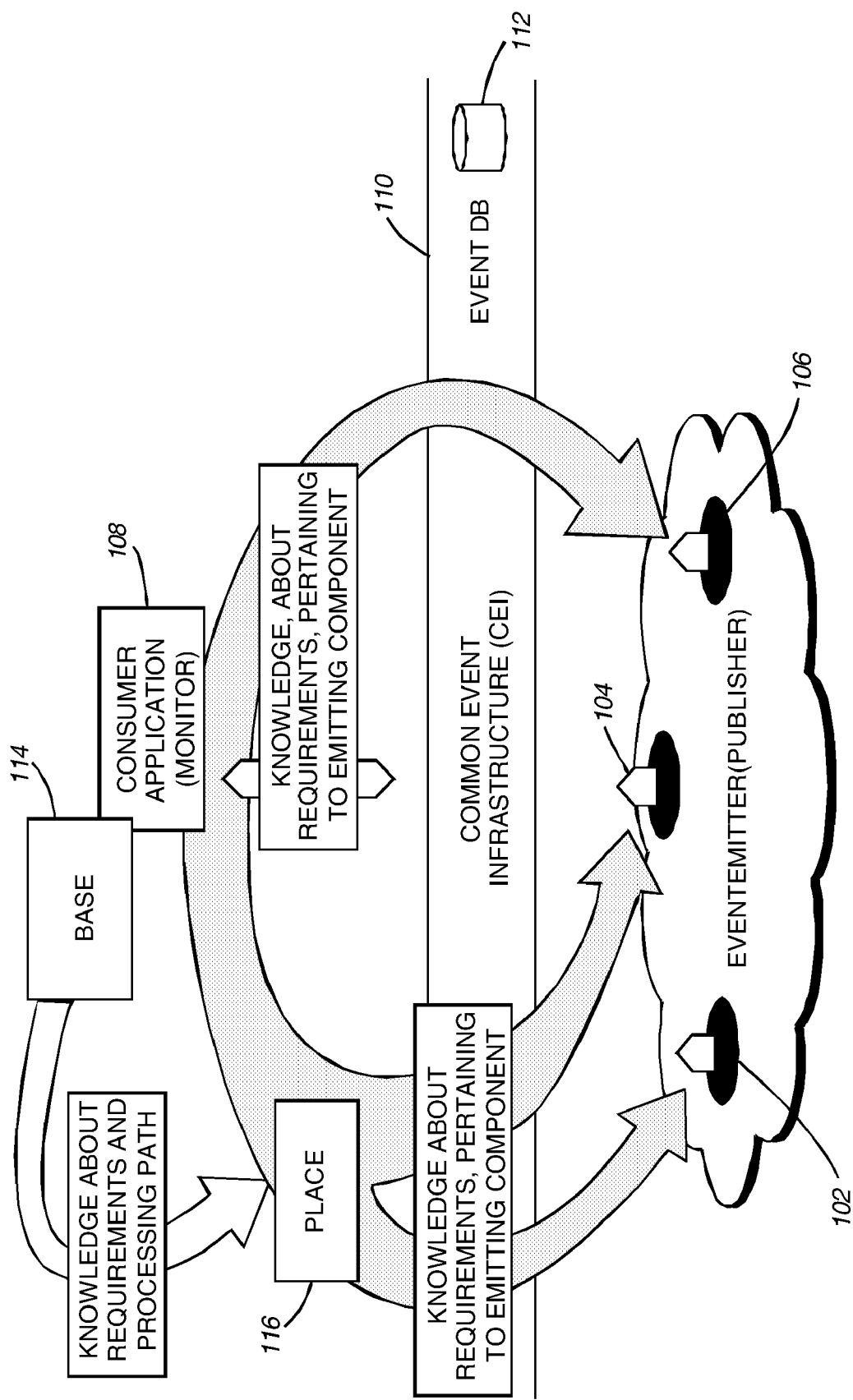
FIG. 1 is a system flow diagram illustrating a flow of events in a bus-connected distributed processing system according to an embodiment of the present invention.

The present invention as would be known to one of ordinary skill in the art could be produced in hardware or software, or in a combination of hardware and software. However in one embodiment the invention is implemented in software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium, which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network that allows a computer to read such computer readable information. The present invention, according to an embodiment, overcomes problems with the prior art by providing a more efficient mechanism for memory copy operations. The present invention allows the processor to continue executing subsequent instructions during a memory copy operation thereby avoiding unnecessary processor downtime.

Exemplary System Flow for an Event Bus Connected System

FIG. 1 shows the flow of events and even metadata in a bus-connected system 100 of event emitters 102, 104, 106 and consumers 108. The event emitters 102, 104, 106, in one embodiment, generate various events and send these events to a common event infrastructure (e.g. event/message bus 110) herein referred to as "message bus 110". An event, in one embodiment, is a message that includes information related to a change of state. For example, a reading from a sensor or a timer. An event can include time-dependent information and can be structured or unstructured text.

In one embodiment, many of the events are stored in an event database 112 for future data mining purposes. Events can either be delivered to an event monitor such as the consumer application 108 when the events occur. For example, an emitter transmits events through the message bus 110 to the event monitor 108. Alternatively, processing requirements are generated at the monitor (consumer 108) and may be pushed down (selectively) all the way to the emitters 104.

This process can be referred to as a push/asynchronous model. Alternatively, an event monitor can retrieve the events via querying the event database 112. This process can be referred to as a pull/synchronous model. Asynchronously delivered events are typically further processed in the monitor (e.g. consumer application 108) in order to compute higher level key performance indicators ("KPIs"). In one embodiment, the event bus 110 is responsible for the correlation and event storage/retrieval, while the monitor is responsible for KPI computation and delivery to monitoring dashboards. A monitoring dashboard, in one embodiment, provides results from the monitoring tasks to a user such as an analyst.

If complex correlations or high event storage/retrieval rates are experienced, the message bus 110 can become a bottleneck. Similarly, the monitor such as the consumer application 108 can become overloaded in the case of event deliveries and complex KPI computation rules. Since many events do not contribute to any dashboard indication and can be filtered out, these events add unnecessary load to the message bus 110 and monitor 108. Therefore, one advantage of the present invention is that event many of the filtering and storage operations are pushed "upstream" towards the event emitters 102, 104, 106 to reduce message flow, which in turn minimizes bottlenecks at the message bus 110.

In one embodiment, the placement of filtering and storage operations closer to the event emitters 102, 104, 106 can be achieved using a Business Analysis Subscription Extractor ("BASE") module 114 and a Placement and Analysis of Conditions over Events ("PLACE") module 116. The BASE module 114, in one embodiment, analyzes the event subscriptions from the monitor 108 and extracts from these subscriptions a canonical set of independent subscriptions that are deployment-ready. In one embodiment, subscriptions are the requests for processed events. Processing can be basic such as filtering conditions, or more complex such as joins. Deployment-ready subscription, in one embodiment, is a description that is formed are prepared in the right format to be correctly processed independently. The PLACE module 116, in one embodiment, takes these subscriptions as input and determines how far "upstream" each of subscriptions should be pushed based on dependency and load considerations. In one embodiment, the BASE module 114 uses specifications of a monitoring model used by the monitor 108. The BASE and PLACE modules 114, 116 are discussed in greater detail below.

Exemplary Distributed Stream Processing System

Figure 2:
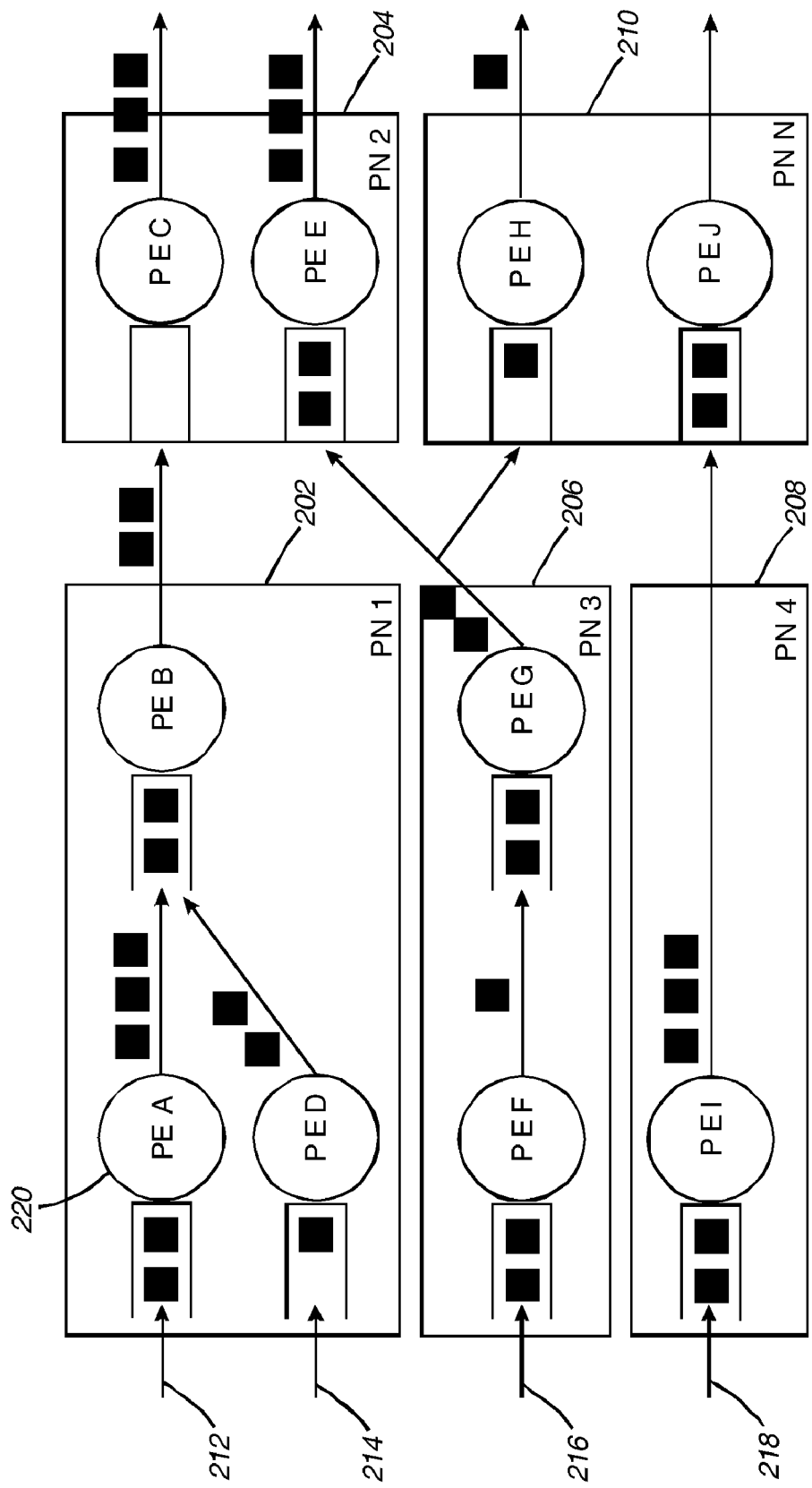
FIG. 2 is a diagram illustrating a distributed processing system according to an embodiment of the present invention.

According to an embodiment of the present invention, as shown in FIG. 2, an exemplary distributed processing system 200 is shown. FIG. 2 shows various real-time streams 212, 214, 216, 218 entering into the system 200 through a subset of physical processing nodes 202, 204, 206, 208, 210. In one embodiment, the distributed processing system 200 is system of physical processing nodes that pass messages between each other through a message bus such as the message bus 110 shown in FIG. 1. The processing nodes 102, 104, 106, 108, 110 may be co-located, for example within a single cluster, or geographically distributed over wide areas.

FIG. 2 also shows applications deployed on the processing nodes 202, 204, 206, 208, 210 as a network of logical operators, or processing elements ("PE") such as PE A 220. Each data stream 212, 214, 216, 218 is comprised of a sequence of Stream Data Objects (SDOs), the fundamental information unit of the data stream. Each processing element performs some computation on the SDOs received from its input data stream, e.g., select, filter, aggregate, correlate, classify, or transform. In one embodiment, each of the physical processing nodes 202, 204, 206, 208, 210 can be either a producer of events, consumer of events, or both.

Exemplary Information Processing System

Figure 3:
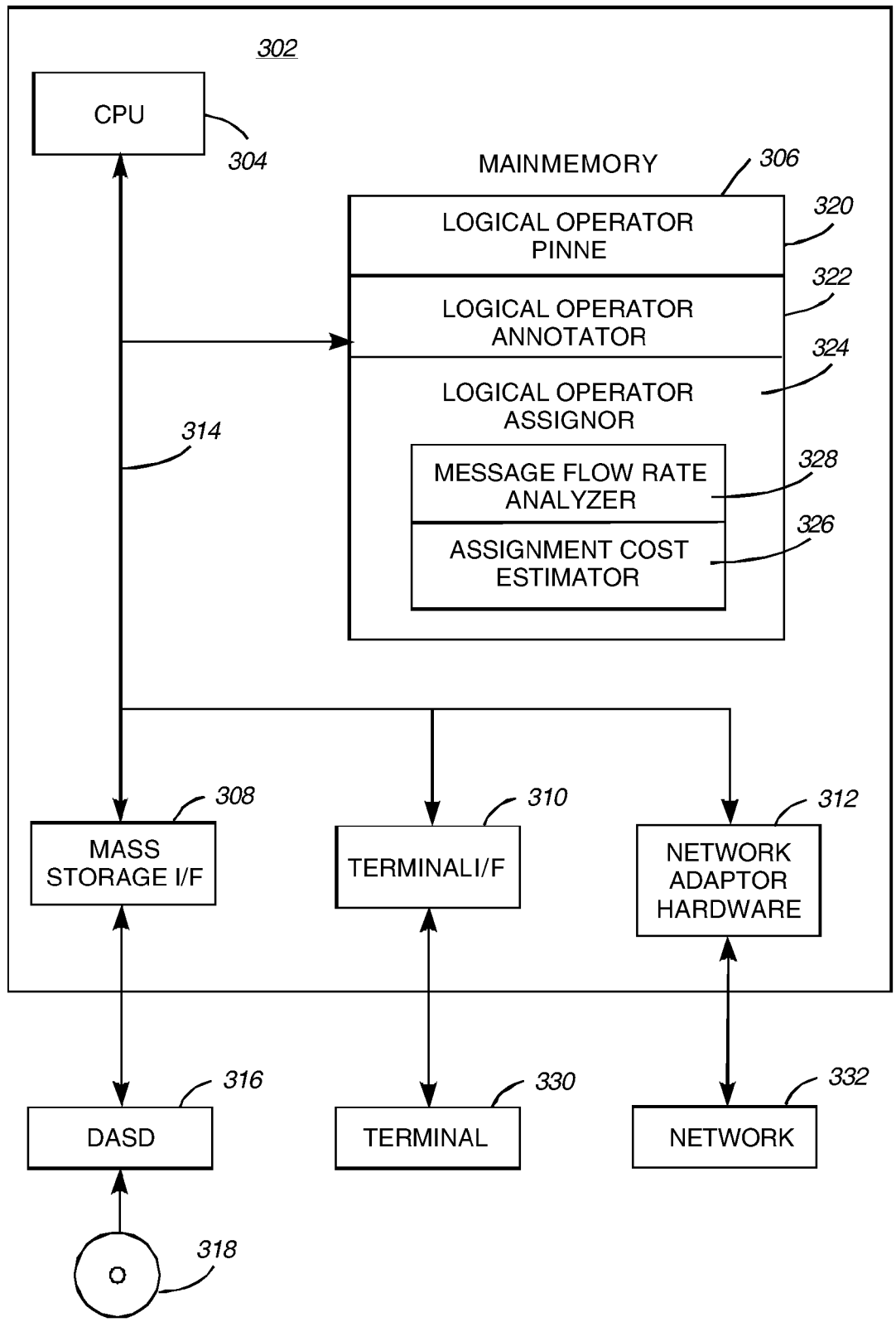
FIG. 3 is a detailed view of an information processing system according to an embodiment of the present invention.

FIG. 3 is a block diagram illustrating a detailed view of an information processing system 300. The information processing system 300, in one embodiment, can be any of the physical processing nodes 202, 204, 206, 208, 210 of FIG. 2. In another embodiment, the information processing system 300 is a separate and distinct information processing system that is communicatively coupled to the processing nodes 202, 204, 206, 208, 210 of FIG. 2.

The information processing system 300 is based upon a suitably configured processing system adapted to implement the exemplary embodiment of the present invention. Any suitably configured processing system is similarly able to be used as the information processing system 124 by embodiments of the present invention, for example, a personal computer, workstation, or the like. The information processing system 300 includes a computer 304. The computer 302 has a processor 304 that is connected to the main memory 306, mass storage interface 308, terminal interface 310, and network adapter hardware 312 via the system bus 314. The mass storage interface 308 is used to connect mass storage devices such as data storage device 316 to the information processing system 300. One specific type of data storage device is a computer readable medium such as a CD drive, which may be used to store data to and read data from a CD 318 or its equivalent. Another type of data storage device is a data storage device configured to support, for example, NTFS type file system operations.

The main memory 306 includes a logical operator pinner 320. The logical operator pinner 320, in one embodiment, determines if a logical operator (e.g., SELECT, JOIN, and the like) requires processing by a specific physical processing node. For example, emitting events are required to take place at the original even emitter and the KPI result, in one embodiment, needs to be returned by a monitoring component (e.g., consumer application 108). In one embodiment, a logical operator can have a cost per even processed, selectivity, input and output conditions, constraints, and the like associated with it. If a logical operator requires processing by a specific physical processing node, the logical operator pinner 320 pins that operator to its required node. In other words, if a logical operator is pinned, the operator is not assigned to another physical processing node.

The main memory 306 also includes a logical operator annotator 322. The logical operator annotator 322, in one embodiment, determines the message flow rates of a logical operator. For example, an input message flow rate and an output message flow rate are determined for each logical operator. The logical operator annotator 322, in one embodiment, then annotates each logical operator with its input/output message flow rate. The main memory 306 also includes a logical operator assignor 324. The logical operator assignor 324, in one embodiment, assigns each logical operator to a physical processing node. For example, the logical operator assignor 324, in one embodiment, assigns each logical operator to an initial physical processing node.

After an initial assignment of the logical operators to physical processing nodes, a cost estimator 326 can estimate a total message flow cost associated with the initial assignment. The total message flow cost, for example, is based upon the message flow rates associated with each logical operator that transmits a message to a physical processing node. The logical operator assignor 324, in one embodiment, also performs subsequent assignments of logical operators to physical processing nodes. For example, a message flow rate analyzer 328 analyzes the input and output message flow rates of each logical operator. The message flow analyzer 328 then determines if the sum of the message flow input rates are greater or equal to the sum of the message flow output rates. If this is true, the logical operator assignor 324 assigns the logical operator to a physical processing node that is situated at a position on the event/message bus for a given message flow sequence that precedes the position of the current physical processing node assigned to the logical operator.

If the sum of the input rates are greater or equal to the sum of the output rates of the logical operator, the logical operator is likely performing filtering. By reassigning the logical operator so that it performs its filtering earlier in time helps avoid bottlenecks on the message bus. For example, if filtering is performed further down on the message bus 110, unnecessary messages are passed on to physical processing nodes not requiring the messages. If the sum of the input rates are not greater or equal to the sum of the output rates, the logical operator is likely generating messages. Therefore, the logical operator assignor reassigns the logical operator to a physical processing node situated at a position on the event/message bus for a given message flow sequence that is subsequent to the position of the physical processing node currently assigned to the logical operator. This allows for message to be generated closer to a consumer of the message and prevent bottlenecks on the even/message bus.

Once the logical operators have been reassigned, a total message flow cost is determined for this subsequent assignment by the assignment cost estimator 326. The logical operator assignor 324 compares the message flow cost associated with the initial assignment to the message flow cost of the subsequent assignment. If the subsequent message flow cost is lower than the initial message flow cost, the logical operator assignor selects this assignment. In another embodiment, numerous iterations of the assignment process can be performed to determine the assignment configuration that provides the lowest message flow cost possible.

In another embodiment, the logical operator assignor 324 takes into account the available resources of a processing node when assigning a physical processing node to a logical operator. For example, when the logical operator assignor 324 has determined that a logical operator should be reassigned to a preceding physical processing node, the logical operator assignor 324 determines, in one embodiment, if the processing requirements of the logical operator are greater than the available resources of a physical processing node, this node is not assigned to the logical operator. In another embodiment, after the logical operator assignor 324 reassigns the logical operators to physical processing nodes, it determines if any parent logical operators are assigned to a physical processing node that precedes the physical processing node currently assigned to its child logical operator. If this is true, the logical operator assignor 324 reassigns the parent logical operator to the physical processing node of the child logical operator. This allows for messages flowing between a parent logical operator and a child logical operator to occur on the same processing node as compared to flowing from one processing node onto the message bus to another processing node thereby saving resources.

In yet another embodiment, the BASE module 114 can also be included in the main memory 306. The PLACE module can also be included in the main memory 306 and comprise one or more of the elements discussed above that are residing in the main memory 306.

Although illustrated as concurrently resident in the main memory 306 it is clear that respective components of the main memory 306 are not required to be completely resident in the main memory 306 at all times or even at the same time. In one embodiment, the information processing system 300 utilizes conventional virtual addressing mechanisms to allow programs to behave as if they have access to a large, single storage entity, referred to herein as a computer system memory, instead of access to multiple, smaller storage entities such as the main memory 306 and data storage device 316. Note that the term "computer system memory" is used herein to generically refer to the entire virtual memory of the information processing system 300.

Although only one CPU 304 is illustrated for computer 302 computer systems with multiple CPUs can be used equally effectively. Embodiments of the present invention further incorporate interfaces that each includes separate, fully programmed microprocessors that are used to off-load processing from the CPU 304. Terminal interface 310 is used to directly connect one or more terminals 330 to computer 302 to provide a user interface to the computer 302. These terminals 330, which are able to be non-intelligent or fully programmable workstations, are used to allow system administrators and users to communicate with the information processing system 300. The terminal 330 is also able to consist of user interface and peripheral devices that are connected to computer 302 and controlled by terminal interface hardware included in the terminal I/F 310 that includes video adapters and interfaces for keyboards, pointing devices, and the like.

An operating system (not shown) included in the main memory 306 is a suitable multitasking operating system such as the Linux, UNIX, Windows XP, and Windows Server 2003 operating system. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 300. The network adapter hardware 312 is used to provide an interface to a network such as a wireless network, WLAN, LAN, or the like (not shown). Embodiments of the present invention are able to be adapted to work with any data communications connections including present day analog and/or digital techniques or via a future networking mechanism.

Although the exemplary embodiments of the present invention are described in the context of a fully functional computer system, those skilled in the art will appreciate that embodiments are capable of being distributed as a program product via a CD/DVD, e.g. CD 318, or other form of recordable media, or via any type of electronic transmission mechanism.

Exemplary Message Bus

Figure 4:
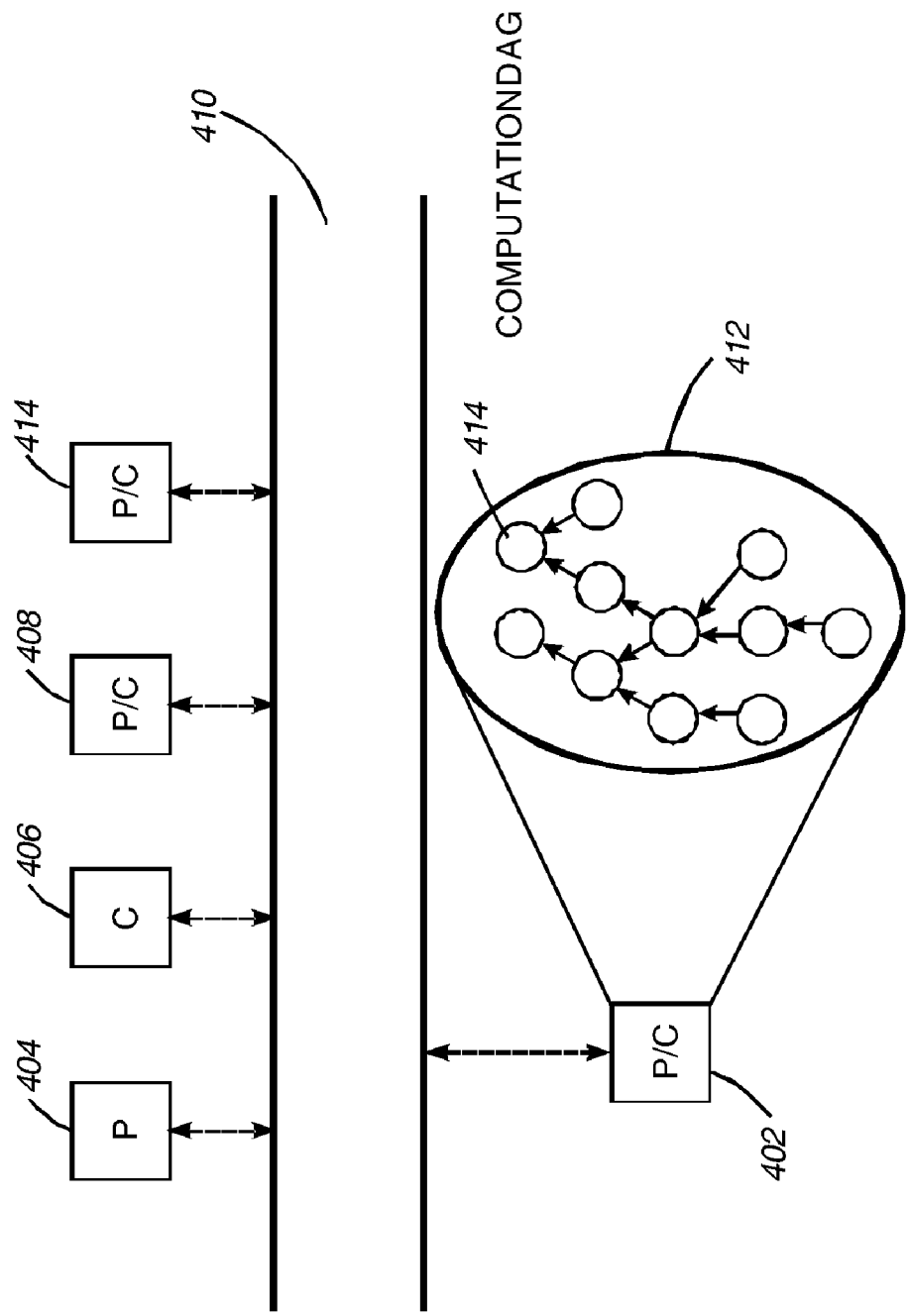
FIG. 4 is a diagram illustrating an exemplary message bus according to an embodiment of the present invention.

FIG. 4 shows an exemplary even/message bus 410, which in one embodiment is a common event interface. In one embodiment, physical processing nodes 402, 404, 406, 408, 414 are communicatively coupled to the message bus 410. A physical processing node, in one embodiment, can include producer of events/message and/or consumers of events/messages such as a monitoring application. In one embodiment, each physical processing node 402, 404, 406, 408, 414 is associated with a set of semantic and computational constraints such as cost and selectivity. These constraints, in one embodiment, dictate which physical processing node the logical operator(s) can be placed on. The message bus 410, in one embodiment, subscribes to a topic produced by an event emitter. Messages that are published for these topics are processed and/or stored by the message bus 410 and then are routed to a logical operator subscribing to those events. Logical operators, on the other hand, receive and process the events. Logical operators, further processes the received messages according to a monitoring model such as the Business Observation Monitor model. An application, on the other hand, is the end point where results are usually returned.

A monitoring computational model used by an application, in one embodiment, can be represented by a DAG 412 of logical operators 414. The DAG 412 comprises nodes representing logical operators. Each logical operator 414, in one embodiment, has associated costs, selectivity and the like. A cost, for example, can be the number of messages processed per unit of time. Leaf nodes, in one embodiment, are logical operators that process incoming events, and nodes without parents are logical operators that complete the computation of key performance indicators ("KPIs"). In one embodiment, the BASE module 114 extracts sub-graphs of operators that can be pushed down to the event bus 110 or emitters.

The BASE module 114, in one embodiment, can be described as a component "outside" of the architectural framework because it analyzes all monitoring models. These subscriptions are stored in an XML file and given to PLACE to be distributed to all components. In a deployment, the BASE module 114 can be either run every time subscriptions change or less frequently. The more often the BASE module 114 is run; a higher selectivity of each filtering condition is yielded. It should be noted that at a minimum BASE module 114 has to be run whenever the scope of the monitoring component "widens", i.e. accepts more events. This helps avoid incorrect filtering of needed events.

The PLACE module 116 is the coordinator between subscriptions derived by the BASE module 114 and components with processing capabilities in the distributed processing system 200. The PLACE module 116 reads the DAG subscriptions from the XML file generated by the BASE module 114, and interacts with other components through a protocol similar to load balancing protocols. If a computational graph in form of a subscription can be pushed all the way to an emitter, it is turned into an emitter filtering condition, thereby reducing the number of events generated by this emitter. If a subscription is pushed into the message bus 410, a filtering condition can be added to the correlation engine, thereby reducing the number of events delivered to the monitoring contexts.

In order to take load into account, the PLACE module 116, in one embodiment, builds a topology structure that represents the processing components, their capabilities and availability. The PLACE module 116 periodically monitors the load of its host and exchanges this information with its neighboring PLACE components using standard load balancing protocols. In one embodiment, the PLACE module 116 assigns the logical operators (from the DAG subscriptions) to the physical nodes that are the event consumers or emitters with processing capabilities. The assignment process is discussed below.

Assignment of Logical Operators to Physical Processing Nodes

Figure 5:
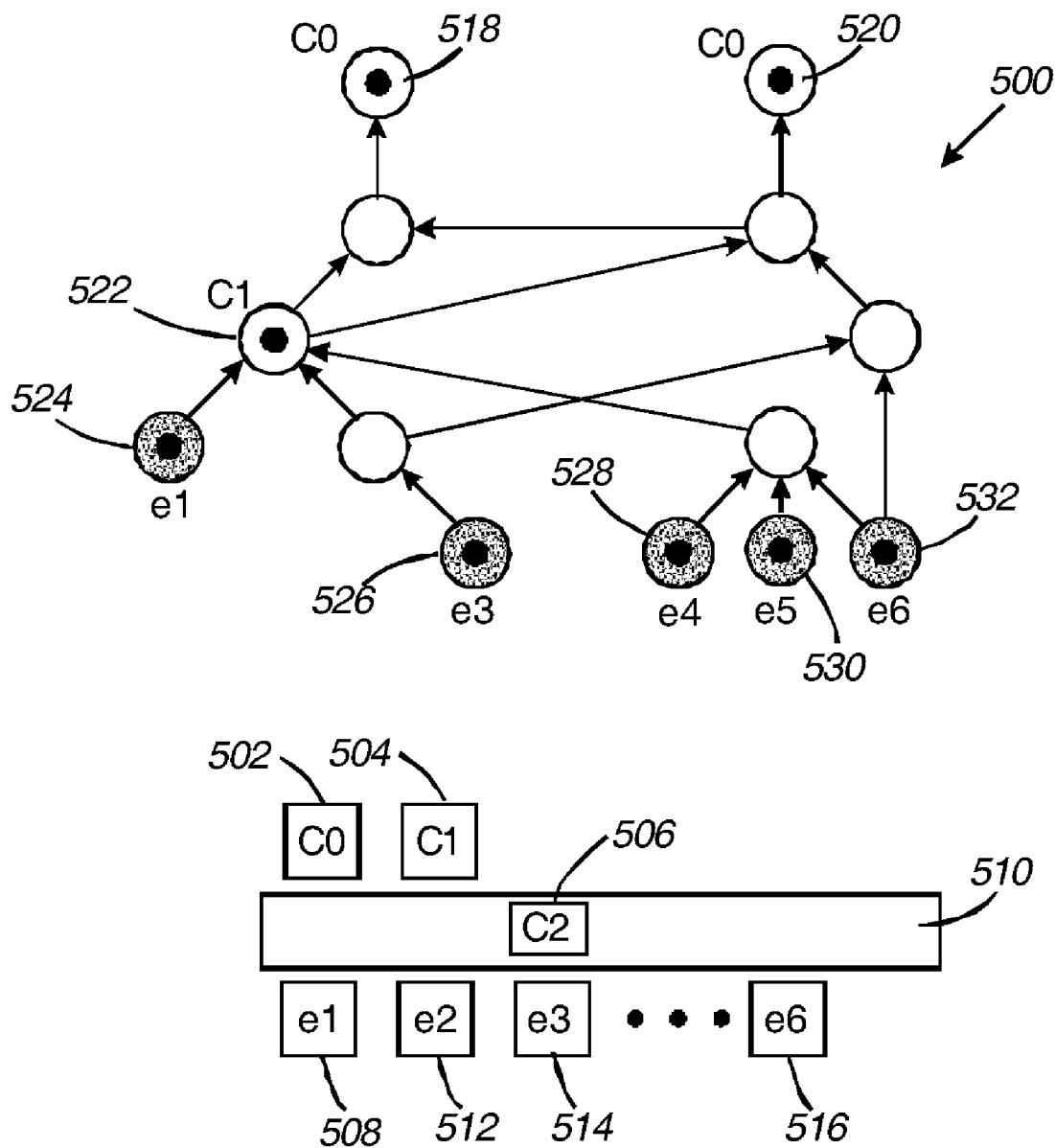
FIG. 5 is a directed acyclic graph illustrating the pinning of logical operators to a physical processing node according to an embodiment of the present invention.

FIGS. 5-9 show DAGs illustrating the assignment of logical operators to physical processing nodes. FIG. 5 shows a DAG 500 comprising a plurality of nodes corresponding to logical operators. FIG. 5 (and FIGS. 6-9) also includes an exemplary message bus 510 including a set of physical processing nodes 502, 504, 506, 508, 512, 514, 516. The message bus 510 is shown as a reference to illustrate the placement of the physical processing nodes on the event bus 510. For example, in a given message flow sequence, physical processing node C0 502 performs processing before physical processing node C1 504.

As described above, each logical operator includes an associated cost per message process, selectivity, input and output conditions, constraints, and the like which are used by the logical operator assignor 324 when assigning operators to processing nodes. The physical processing nodes 502, 504, 506, 508, 512, 514, 516, in one embodiment, also have known capabilities for accepting and processing subscriptions (e.g. memory and CPU resources allocated for processing subscriptions). If any of the logical operators require processing on a specific physical processing node, these logical operators are pinned to the node. For example, logical operators 518, 520, 522, 524, 526, 528, 530, 532, in one embodiment, require processing on physical processing nodes C0 502, C1 504, e1 508, e2 512, e3 514, e6 516, respectively. Therefore, these logical operators 518, 520, 522, and emitting logical operators 524, 526, 528, 530, 532 are pinned to these physical processing nodes. In other words, the pinned logical operators 518, 520, 522, 524, 526, 528, 530, 532 are not re-assigned to another physical processing node. A pinned logical operator is denoted by a darkened circled within the logical operator.

Figure 6:
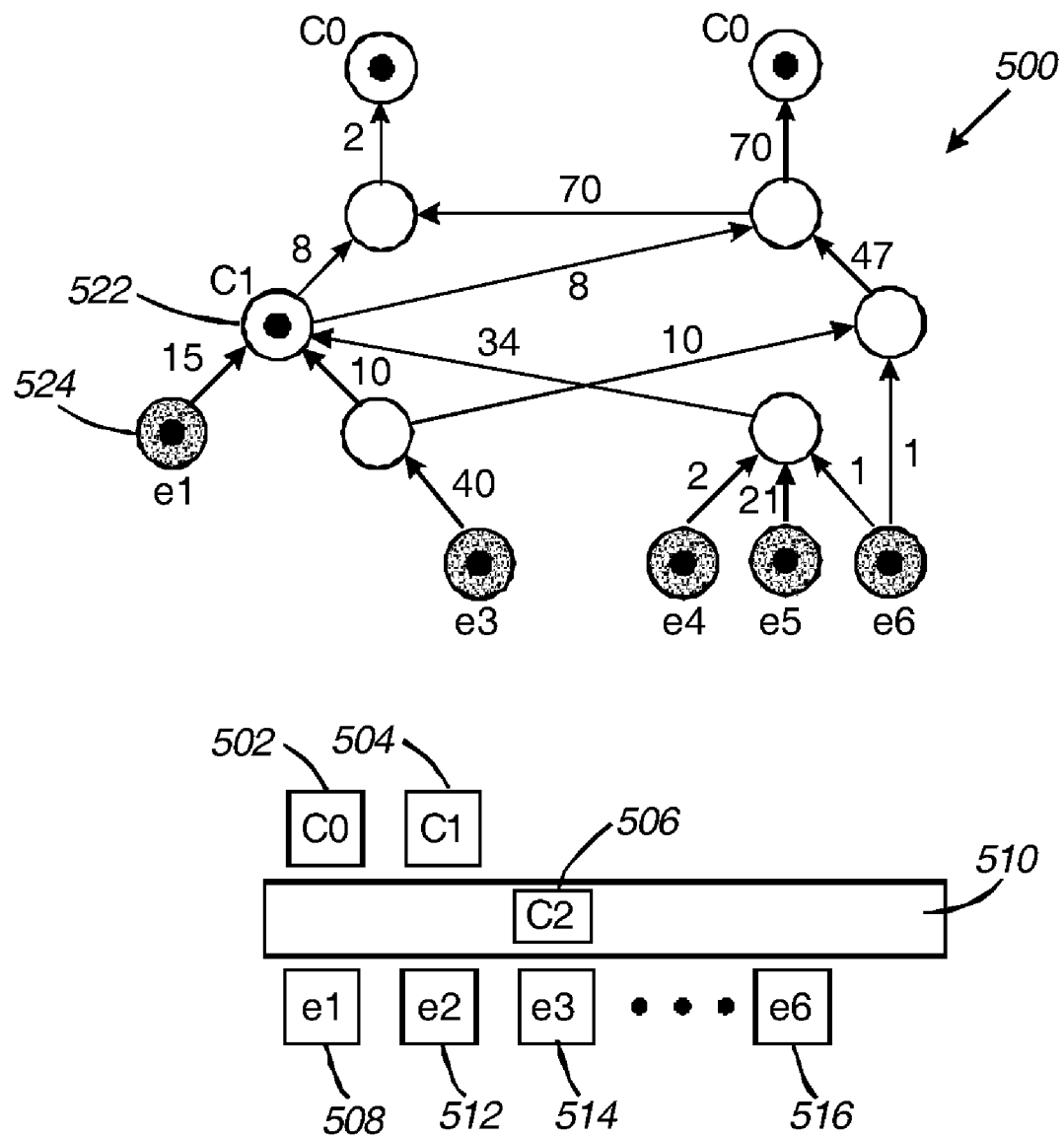
FIG. 6 illustrates the directed acyclic graph of FIG. 5, wherein the logical operators have been annotated to show message flow rates according to an embodiment of the present invention.
Figure 7:
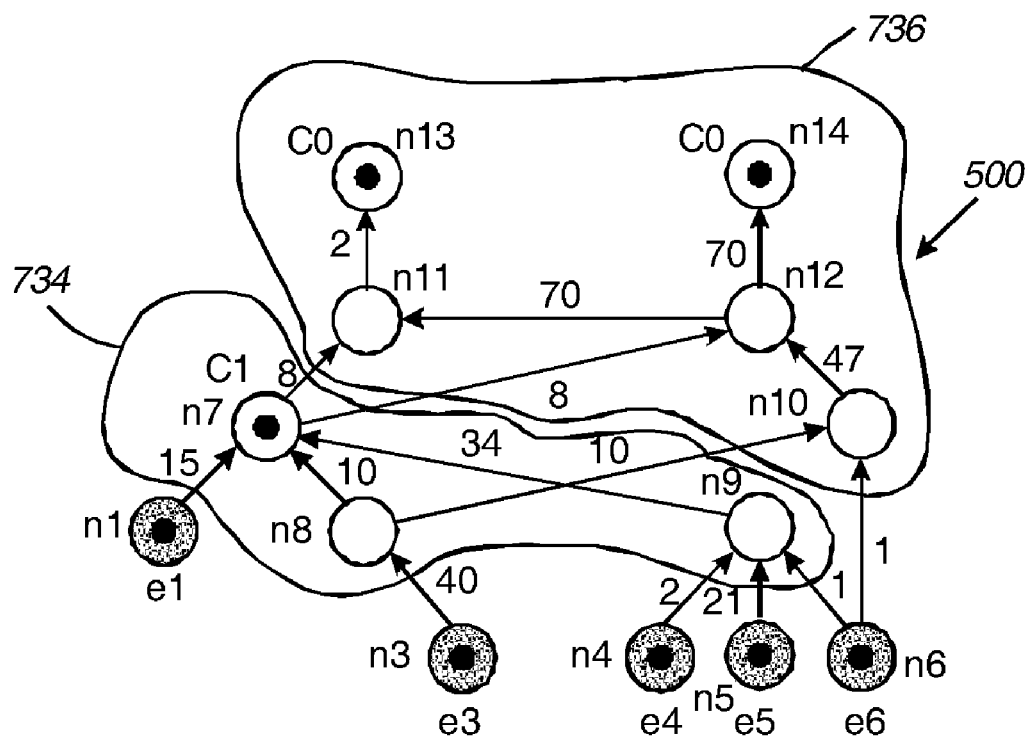
FIG. 7 illustrates the directed acyclic graph of FIG. 5, wherein the logical operators have been assigned to an initial physical processing node according to an embodiment of the present invention.
Figure 7:
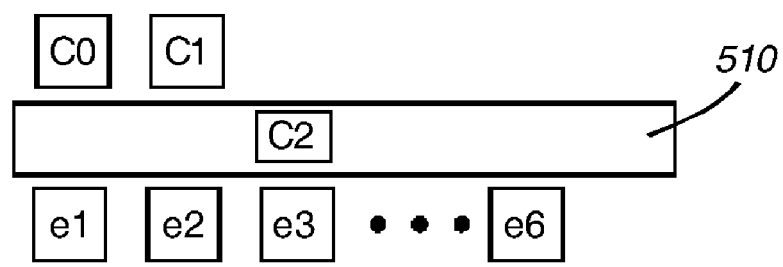

In one embodiment, each edge connecting one logical operator to another logical operator is annotated with expected flow rates, as shown in FIG. 6. For example, the expected message flow rate from logical operator 524 to logical operator 522 is 15 messages per unit of time. Expected message flow rates, in one embodiment, are determined from statistics calculated from distributions and/or initial rate assumptions, observations, simple assumptions such as a rating of high/low or high/medium/low, and the like. The logical operators are then assigned to initial physical processing node, as shown in FIG. 7. For example, pinned sub-graphs 734, 736 are assigned to the hosting component of the root. A pinned sub-graph, in one embodiment, is a sub-graph that has as a root, a pinned node and all children are not pinned. An initial cost as messages per unit of time, in one embodiment, is determined for the initial assignment. For example, the cost for partition1 734 of the initial assignment shown in FIG. 7 is (15+40+2+21+1)(2)=158 messages/unit of time and the coast for partition2 736 of the initial assignment is (8+8+10+1)(2) =54 messages/unit of time. Therefore, the total cost for the initial assignment is 212 messages/unit of time. The message flow cost for each of the sub-graphs 734, 736 is multiplied by 2 because the messages flow from one physical node onto the message bus 510 to another physical processing node.

It should be noted that the initial assignment of logical operators to physical processing nodes may yield an infeasible solution with respect to the resources of the physical processing nodes. However, as is discussed below, this initial assignment is further refined for determining the assignment that yields a more optimal assignment configuration.

Figure 8:
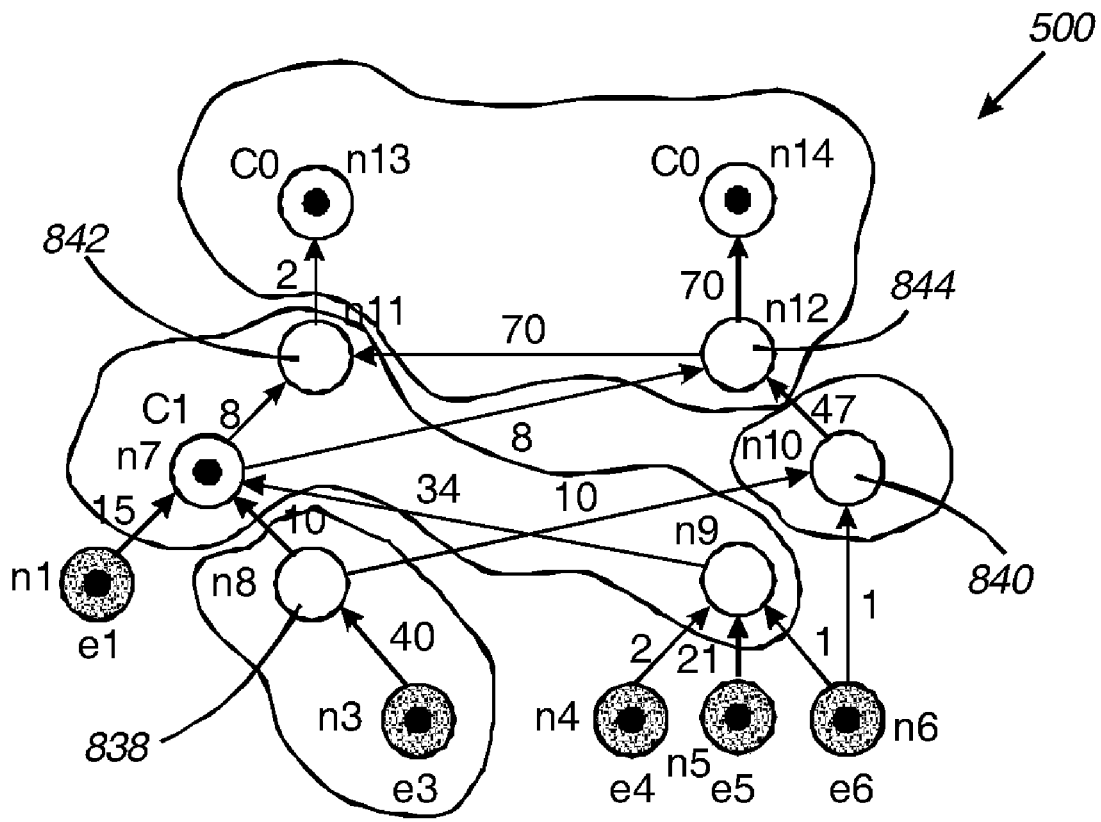
FIG. 8 illustrates the reassignment of a parent logical operator in FIG. 7 to a physical processing node assigned to a child logical operator according to an embodiment of the present invention.
Figure 8:
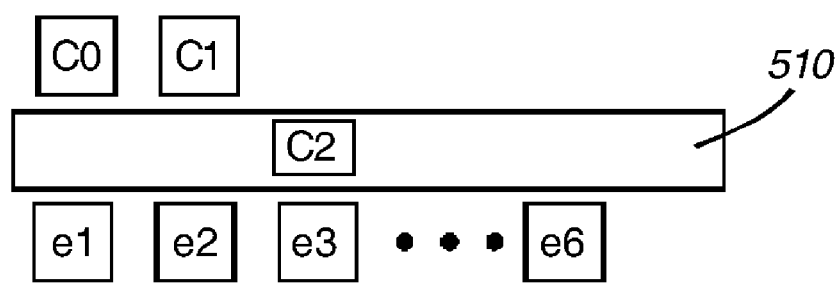

FIG. 8 shows the refinement of the initial assignment of physical processing nodes illustrated in FIG. 7. Starting from the bottom of the DAG 500 and moving upwards, each operator is assigned an ordered set of placement choices ranging from "early" to "late". This is accomplished, in one embodiment, by comparing the sum of input message flow rates and the sum of the output message flow rates of a logical operator. For example, if the sum of the input message flow rates is greater than or equal to the sum of the output message flow rates, the logical operator is places as "early as possible on a physical processing node. For example, node n8 838, which was originally assigned to physical processing node C1 504, has an input message flow rate of 40 and an output message flow rate of 20. Therefore, node n8 838 is reassigned to a physical processing node that is situated at a position on the message bus 510 for a given message flow sequence preceding the position of the physical processing node currently assigned to the node n8 338.

If a logical operator is outputting a smaller number of messages than the number of messages being inputted, the logical operator is likely performing filtering. By moving filtering operations upstream so that they are performed earlier than later, unnecessary messages are not passed onto applications not requiring them. This minimizes bottle necks on the message bus 510. In one embodiment, the available resources of the physical processing node are taken into account when assigning a logical operator to the physical processing node. In other words, if the available resources are less than the cost associated with the logical operator, this particular processing node is not assigned to the logical operator.

If the sum of the input message flow rates is less than the sum of the output message flow rates, the logical operator is placed as "late" as possible given the available resources of a physical processing node. For example, node (logical operator) n10 840, which was initially assigned to physical processing node C0 502, has an input message flow rate of 11 and an output message flow rate of 47. Therefore, node n10 840 is reassigned to a physical processing node C2 506, which is situated at a position on the message bus 510 for a given message flow sequence that is subsequent to the position of C1 504, which is the current physical processing node assigned to node n10 840. In one embodiment, if a processing node is outputting more messages than the number of message being received, it is likely a producer of messages. By moving these logical operators to a physical processing node so that the production of message is performed as late in as possible, the message bus 110 is not saturated with messages thereby causing a bottleneck.

Figure 9:
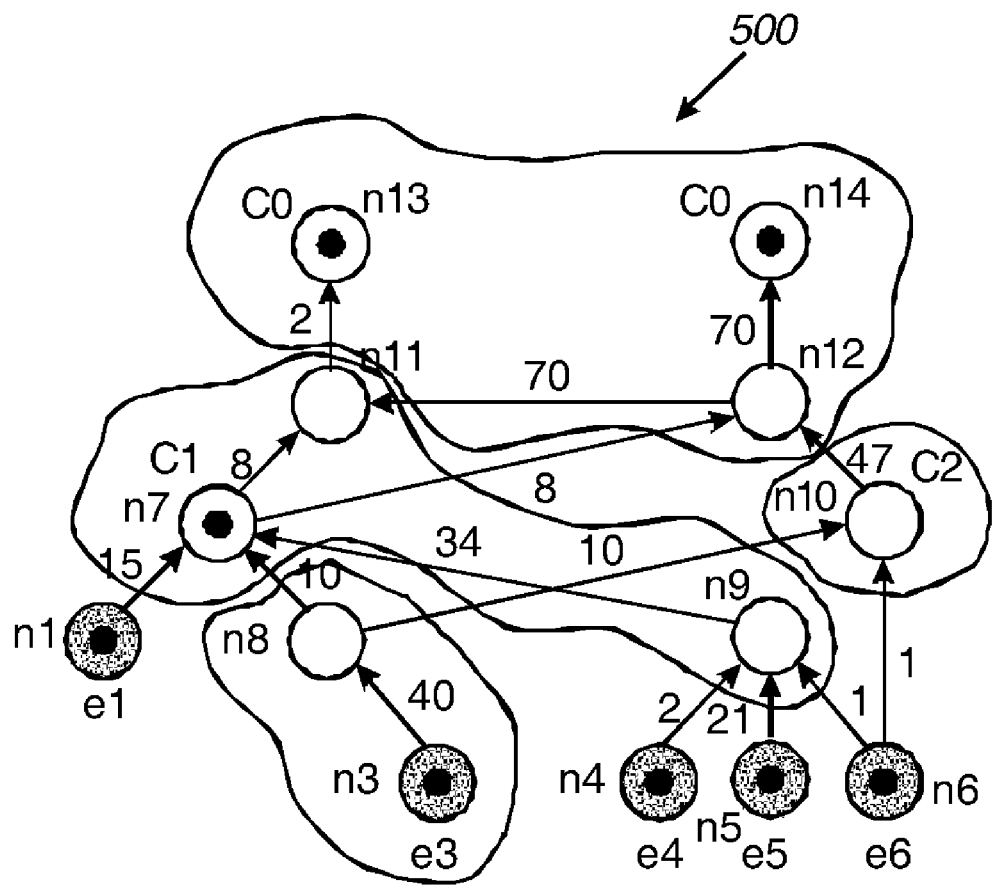
FIG. 9 illustrates the reassignment of the logical operators in FIG. 7 to physical processing nodes according to an embodiment of the present invention.

In one embodiment, the cycles are resolved. In other words, for every parent logical operator, it is determined if it is assigned to an "earlier" physical processing node than any of its children logical operators. If this is true, the parent logical operator is reassigned to the physical processing node of that child. For example, FIG. 8 shows the parent logical operator n1 842 being assigned to physical processing node C0 502. However, its child logical operator n12 844 is assigned to physical processing node C1 500, which is a "later" processing node than C0 502. It should be noted that the node IDs are arbitrary in this example. This causes message transmitted from the parent node n11 842 to its child node n12 844 and vice-versa to have to go on the message bus 510. Therefore, the parent node is reassigned to the physical processing node C0 502, the physical processing node currently assigned to the child node n12 844, as shown in FIG. 9. Therefore, the messages between the parent node n11 842 and the child node n12 844 do not have to cross the message bus 510 thereby saving system resources and minimizing bottlenecks.

A cost associated with the reassigned physical processing node configuration, in one embodiment, is also determined. For example, the cost of logical operators being assigned to physical processing node C0 502 is (8+8)(2)+47=79, the cost of logical operators being assigned to physical processing node C1 504 is (15+10+2+21+1)(2)=98, and the cost of logical operators being assigned to physical processing node C2 506 is (10+1)=11 yielding a total message flow cost for the reassignment of 79+98+11=188. The cost associated with the reassignment configuration can then be compared with the cost of the initial configuration which is 212. As can be seen, the cost associated with the reassignment configuration is less than the cost associated with the initial configuration and is therefore selected for implementation. Subsequent assignments can be performed to determine if a more optimal (e.g. less costly) physical processing node assignment configuration exists.

Figure 10:
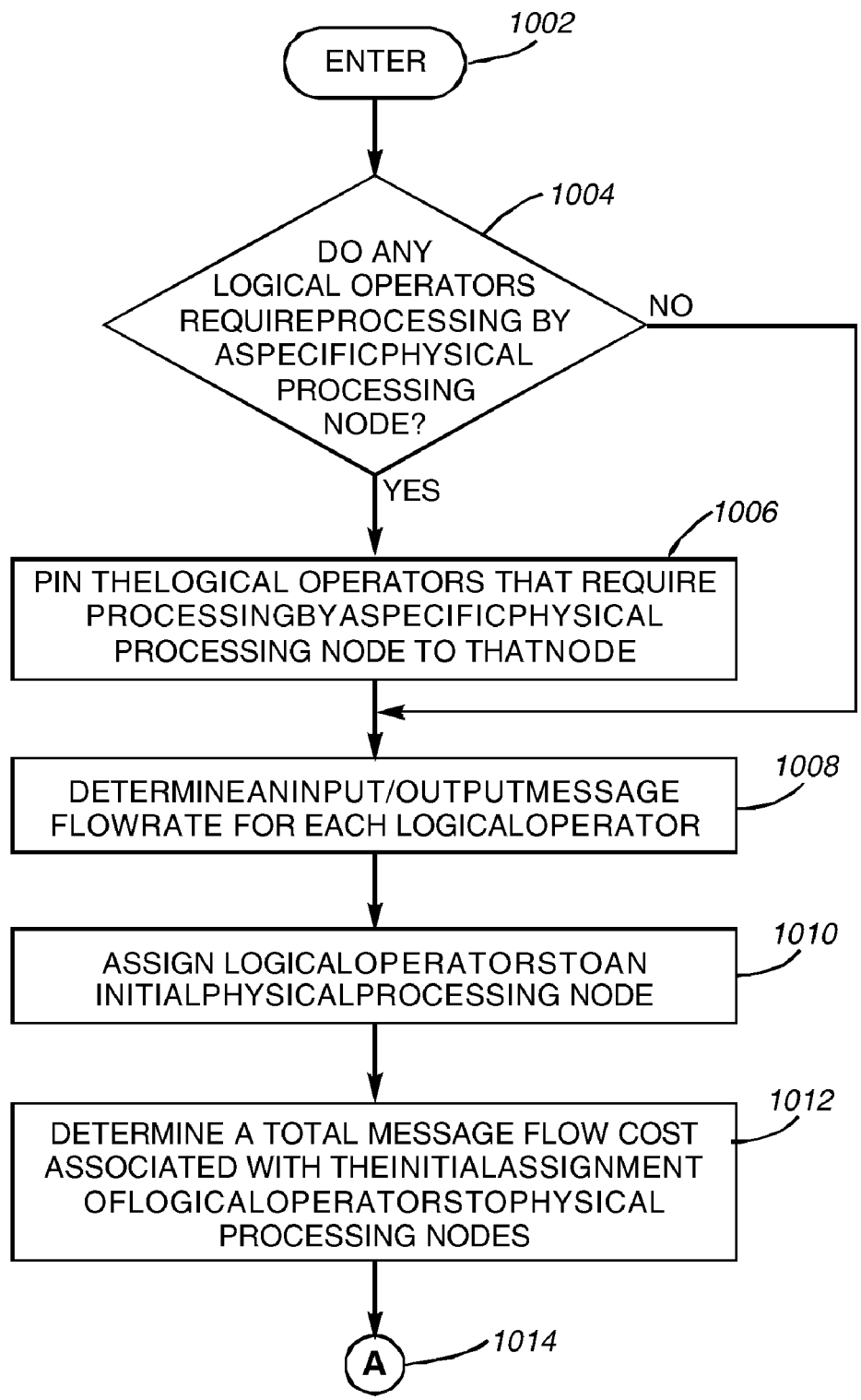
FIG. 10 is an operational flow diagram illustrating an exemplary process of initially assigning logical operators to physical processing nodes according to an embodiment of the present invention.

Exemplary Process of Initially Assigning Physical Processing Nodes to Logical Operators FIG. 10 shows an exemplary process of initially assigning physical processing nodes to logical operators. The operational flow diagram of FIG. 10 begins at step 1002 and flows directly to step 1004. The logical operator assignor 324, at step 1004, determines if any of the logical operators requires processing by a specific physical processing node. If the result of this determination is negative, the control flows to step 1008. If the result of this determination is positive, the logical operator assignor 324, at step 1006, pins these logical operators to their required physical processing node. The logical operator assignor 324, at step 1008, determines an input and output message flow rate for each logical operator. The logical operators, at step 1010, are then each assigned to an initial physical processing node. The logical operator assignor, at step 1012, then determines a total message flow cost for the initial assignment of physical processing nodes to logical operators. The control flow then continues to entry point A of FIG. 11.

Exemplary Process of Reassigning Physical Processing Nodes to Logical Operators

Figure 11:
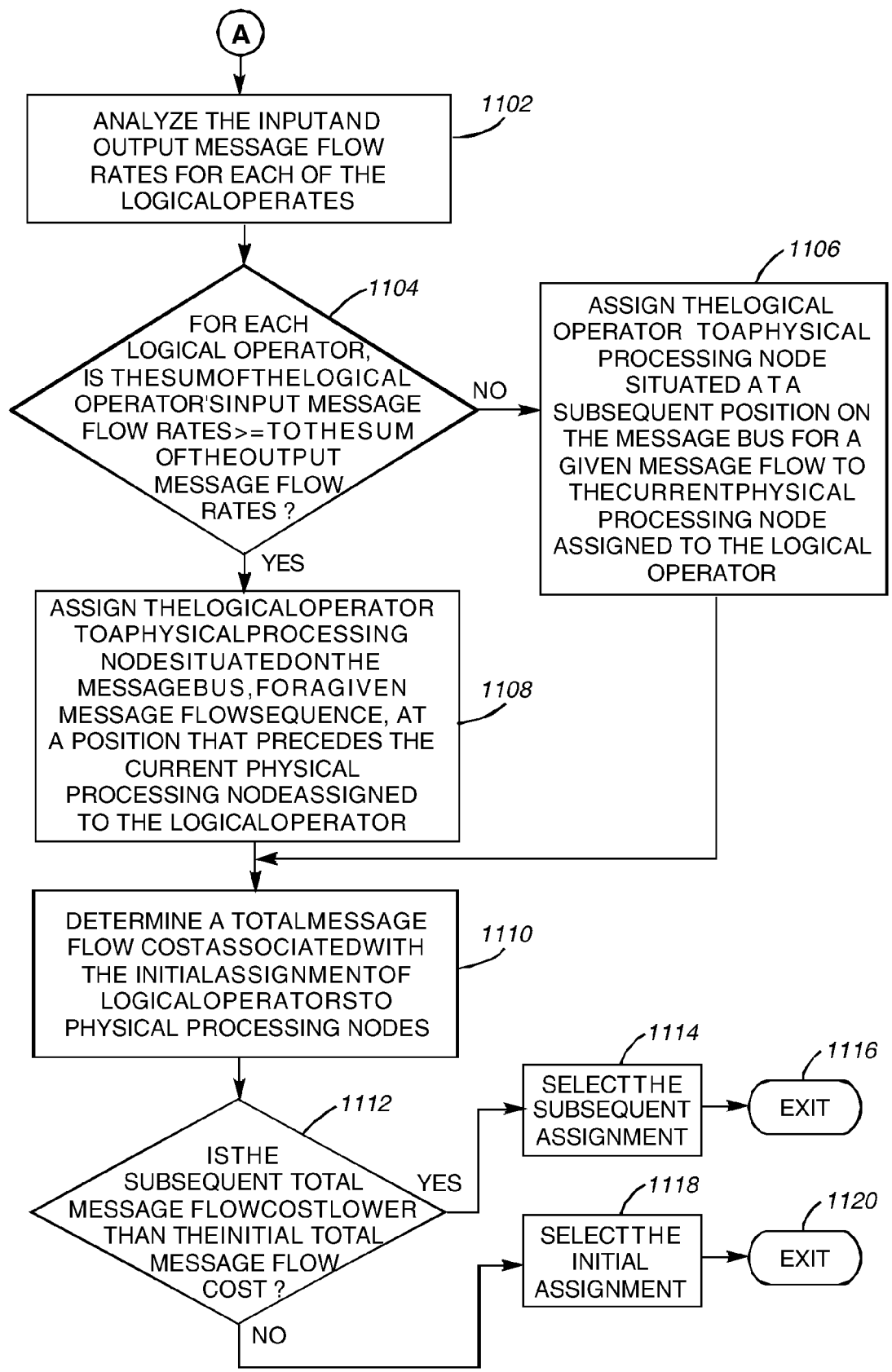
FIG. 11 is an operational flow diagram illustrating an exemplary process of reassigning logical operators to physical processing nodes according to an embodiment of the present invention.

FIG. 11 shows an exemplary process of reassigning physical processing nodes to logical operators for determining an optimal assignment configuration. The operational flow diagram enters at entry point A and flows directly to step 1102. The logical operator assignor 324, at step 1102, analyzes the input and output message flow rates for each logical operator. The logical operator assignor 324, at step 1104, determines for each logical operator if the sum of the input message flow rates greater than or equal to the sum of the output message flow rates. If the result of this determination is negative, the logical operator assignor 324, at step 1106, assigns the logical operator to a physical processing node situated at a subsequent position on the message bus 324 for a given message flow sequence than the physical processing node currently assigned to the logical operator. The control then flows to step 1110.

If the result of this determination is positive, the logical operator assignor 324, at step 1108, assigns the logical operator a physical processing node situated at a position on the message bus (for a given message flow sequence) that precedes the position of the physical processing node currently assigned to the logical operator. The logical operator assignor 324, at step 1110, determines a total message flow cost associated with the reassignment of physical processing nodes to logical operators.

The logical operator assignor 324, at step 1112, then determines of the subsequent total message flow cost is lower than the initial message flow cost. If the result of this determination is positive, the logical operator assignor 324, at step 1114, selects the subsequent assignment. The control flow then exits at step 1116. If the result of this determination is negative, the logical operator assignor 324, at step 1118, selects the initial assignment. The control flow then exits at step 1120. In one embodiment, when the logical operator is reassigning the logical operators, it takes into account the available resources of the candidate physical processing node. For example, if the available resources of the physical processing node are node greater than or equal to the cost of the logical operator, the logical operator is not assigned to this physical processing node.

Figure 12:
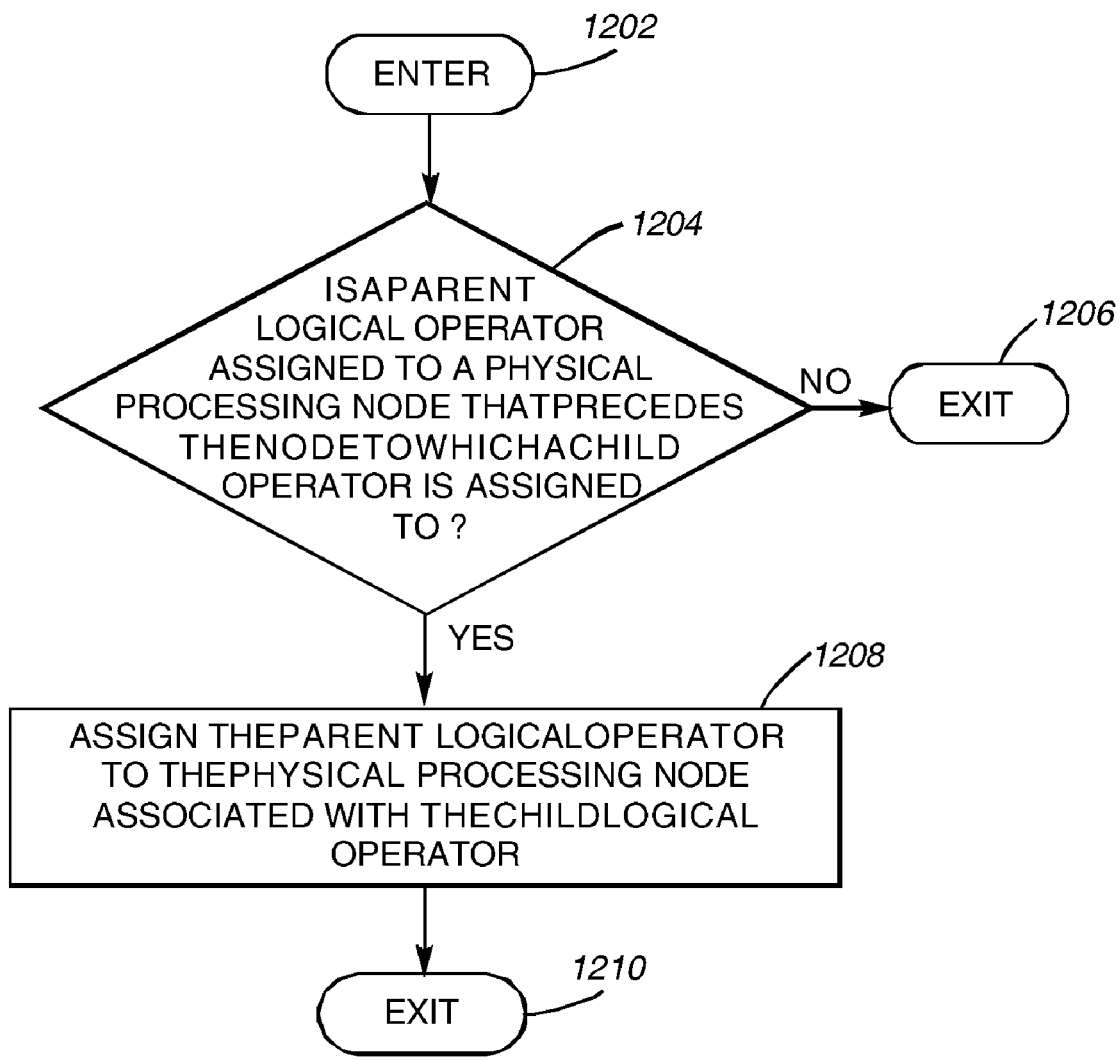
FIG. 12 is an operational flow diagram illustrating an exemplary process of reassigning a parent logical operator to a physical processing node assigned to a child logical operator according to an embodiment of the present invention.

Exemplary Process of Reassigning a Parent Logical Operators to the Physical Processing Node of a Child Logical Operator FIG. 12 shows an exemplary process of assigning a parent logical operator to the physical processing node of one of its children logical operators. The operational flow begins at step 1202 and flows directly to step 1204. The logical operator assignor 324, at step 1204, determines if a parent logical operator is assigned to a physical processing node that is situated at a position on the message bus preceding the position of the physical processing node currently assigned to a child logical operator. If the result of this determination is negative, the control flow then exits at step 1206. If the result of this determination is positive, the logical operator assignor 324, at step 1208, reassigns the parent logical operator to the physical processing node currently assigned to the child logical operator. The control flow then exits at step 1210.

NON-LIMITING EXAMPLES

The present invention can be realized in hardware, software, or a combination of hardware and software. A system according to a preferred embodiment of the present invention can be realized in a centralized fashion in one computer system or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

In general, the routines executed to implement the embodiments of the present invention, whether implemented as part of an operating system or a specific application, component, program, module, object or sequence of instructions may be referred to herein as a "program." The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method, with an information processing system, for reducing message flow on a message bus, the method comprising:

determining if at least one logical operator in a plurality of logical operators requires processing on a given physical processing node in a group of physical nodes;

pinning, in response to determining that the logical operator requires processing on the given physical processing node, the logical operator to the given physical processing node, wherein the pinning prevents any subsequent reassignment of the logical operator to another physical processing node;

assigning each logical operator in the plurality of logical operators to an initial physical processing node in the group of physical processing nodes on a message bus;

determining if at least one logical operator in the plurality of logical operators needs to be reassigned to a different physical processing node based on a difference between a set of input message flow rates and a set of output message flow rates associated with the at least one logical operator, wherein the determining further comprises determining, for the logical operator in the plurality of logical operators, if a sum of the set of input message flow rates associated with the logical operator is at least one of greater than and equal to a sum of the set of output message flow rates associated with the logical operator; and responsive to determining that the at least one logical operating in the plurality of logical operators needs to be reassigned to a different physical processing node, reassigning the at least one logical operator to the different physical processing node, wherein the reassigning comprises:

assigning, in response to the sum of the set of input message flow rates being one of greater than and equal to the sum of the set of output message flow rates, the logical operator to a preceding physical processing node situated at a position on the message bus for a given message flow sequence preceding the physical processing node to which the logical operator is currently associated therewith; and assigning, in response to the sum of the set of input message flow rates being less than the sum of the set of output message flow rates, the logical operator to a subsequent processing node situated at a subsequent position on the message bus for the given message flow sequence to the physical processing node to which the logical operator is currently associated therewith.

2. The method of claim 1, further comprising:
determining a message flow rate associated with each logical operator in the plurality of logical operators.

3. The method of claim 2, wherein the message flow rate is determined based on at least one of:
statistics;
observations; and
assumptions.

4. The method of claim 1, further comprising:
determining a total message flow cost associated with the assigning each logical operator in the plurality of logical operators to a respective initial physical processing node.

5. The method of claim 4, wherein the total message flow cost comprises a summation of message flow rates associated with each logical operator that transmits a message to the initial physical processing node.

6. The method of claim 1, wherein the assigning, in response to the sum of the set of input message flow rates being one of greater than and equal to the sum of the set of output message flow rates, further comprises:

determining if the physical processing node comprises available resources to satisfy a resource requirement of the logical operator; and assigning, in response to the physical processing node comprising available resources, the logical operator to the physical processing node situated at the position on the message bus the physical processing node to which the logical operator is currently associated therewith.

7. The method of claim 1, further comprising:
determining if at least one logical operator in the plurality of logical operators is a parent of at least one other logical operator;
determining, in response to the logical operator being a parent, if the logical operator is assigned to a preceding physical processing node situated at a position on the message bus for the given message flow sequence preceding the physical processing node to which a child logical operator of the logical operator is assigned to; and
reassigning, in response to the logical operator being on the preceding physical processing node, the logical operator to the physical processing node to which the child logical operator is assigned to therewith.

8. The method of claim 1, further comprising:
determining a total message flow cost associated with the assignment of the plurality of logical operators to each physical processing node.

9. The method of claim 1, wherein the total message flow cost comprises a summation of message flow rates associated with each logical operator that transmits a message to a physical processing node.

10. The method of claim 1, further comprising:
determining if a subsequent message flow cost associated with assigning each of the logical operators to one of the preceding physical processing node and the subsequent physical processing node is lower than an initial message flow cost associated with assigning each of the logical operators to an initial physical processing node; and
selecting, in response to the subsequent message flow cost being lower than the initial message flow cost, the assignment of the logical operators associated with the subsequent message flow cost.

11. An information processing system for reducing message flow on a message bus, the information processing system comprising:
a memory;
a processor communicatively coupled to the memory; and
a logical operator pinner communicatively coupled to the memory and the processor, wherein the processor is configured to perform a method comprising:
determining if at least one logical operator in a plurality of logical operators residing on at least one of the physical processing nodes requires processing on one of the physical processing nodes;
pinning, in response to determining that the logical operator requires processing on the given physical processing node, the logical operator to the given physical processing node; wherein the pinning prevents any subsequent reassignment of the logical operator to another physical processing node;
assigning each logical operator in the plurality of logical operators to an initial physical processing node in the plurality of physical processing nodes on a message bus
determining if at least one logical operating in the plurality of logical operators needs to be reassigned to a different physical processing node based on a difference between a set of input message flow rates and a set of output message flow rates associated with the at least one logical operator, wherein the determining further comprises
determining, for the logical operator in the plurality of logical operators, if a sum of the set of input message flow rates associated with the logical operator is at least one of greater than and equal to a sum of the set of output message flow rates associated with the logical operator; and
responsive to determining that the at least one logical operating in the plurality of logical operators needs to be reassigned to a different physical processing node, reassigning the at least one logical operator to the different physical processing node, wherein the reassigning comprises:
assigning, in response to the sum of the set of input message flow rates being one of greater than and equal to the sum of the set of output message flow rates, the logical operator to a preceding physical processing node situated at a position on the message bus for a given message flow sequence preceding the physical processing node to which the logical operator is currently associated therewith; and
assigning, in response to the sum of the set of input message flow rates being less than the sum of the set of output message flow rates, the logical operator to a subsequent processing node situated at a subsequent position on the message bus for the given message flow sequence to the physical processing node to which the logical operator is currently associated therewith.

12. The system of claim 11, wherein the method further comprises:
determining a message flow rate associated with each logical operator in the plurality of logical operators.

13. The system of claim 11, wherein the method further comprises:
an assignment cost estimator for determining a total message flow cost associated with the assigning each logical operator in the plurality of logical operators to a respective initial physical processing node, the message flow cost comprises a summation of message flow rates associated with each logical operator that transmits a message to the initial physical processing node.

14. The system of claim 11, wherein the method further comprises:
determining if a subsequent message flow cost associated with assigning each of the logical operators to one of the preceding physical processing node and the subsequent physical processing node is lower than an initial message flow cost associated with assigning each of the logical operators to an initial physical processing node; and
selecting in response to the subsequent message flow cost being lower than the initial message flow cost, the assignment of the logical operators associated with the subsequent message flow cost.

15. A non-transitory computer readable medium for reducing message flow on a message bus, the computer readable medium comprising instructions for:
determining if at least one logical operator in a plurality of logical operators requires processing on a given physical processing node in a group of physical nodes;
pinning, in response to determining that the logical operator requires processing on the given physical processing node, the logical operator to the given physical processing node, wherein the pinning prevents any subsequent reassignment of the logical operator to another physical processing node;

assigning each logical operator in the plurality of logical operators to an initial physical processing node in the group of physical processing nodes on a message bus;

determining, for at least one logical operator in the plurality of logical operators, if a sum of a set of input message flow rates associated with the logical operator is at least one of greater than and equal to a sum of a set of output message flow rates associated with the logical operator;

assigning, in response to the sum of the set of input message flow rates being one of greater than and equal to the sum of the set of output message flow rates, the logical operator to a preceding physical processing node situated at a position on the message bus for a given message flow sequence preceding the physical processing node to which the logical operator is currently associated therewith; and assigning, in response to the sum of the set of input message flow rates being less than the sum of the set of output message flow rates, the logical operator to a subsequent processing node situated at a subsequent position on the message bus for the given message flow sequence to the physical processing node to which the logical operator is currently associated therewith.

16. The non-transitory computer readable medium of claim 15, further comprising instructions for: determining if at least one logical operator in the plurality of logical operators is a parent of at least one other logical operator;

determining, in response to the logical operator being a parent, if the logical operator is assigned to a preceding physical processing node situated at a position on the message bus for the given message flow sequence preceding the physical processing node to which a child logical operator of the logical operator is assigned to; and reassigning, in response to the logical operator being on the preceding physical processing node, the logical operator to the physical processing node to which the child logical operator is assigned to therewith.

17. The non-transitory computer readable medium of claim 15, further comprising instructions for:

determining if a subsequent message flow cost associated with assigning each of the logical operators to one of the preceding physical processing node and the subsequent physical processing node is lower than an initial message flow cost associated with assigning each of the logical operators to an initial physical processing node; and selecting, in response to the subsequent message flow cost being lower than the initial message flow cost, the assignment of the logical operators associated with the subsequent message flow cost.

* * * * *